No. 887,092. PATENTED MAY 12, 1908.
T. A. HEARSON.
CENTERING AND GAGING INSTRUMENT FOR BARS.
APPLICATION FILED JUNE 7, 1907.
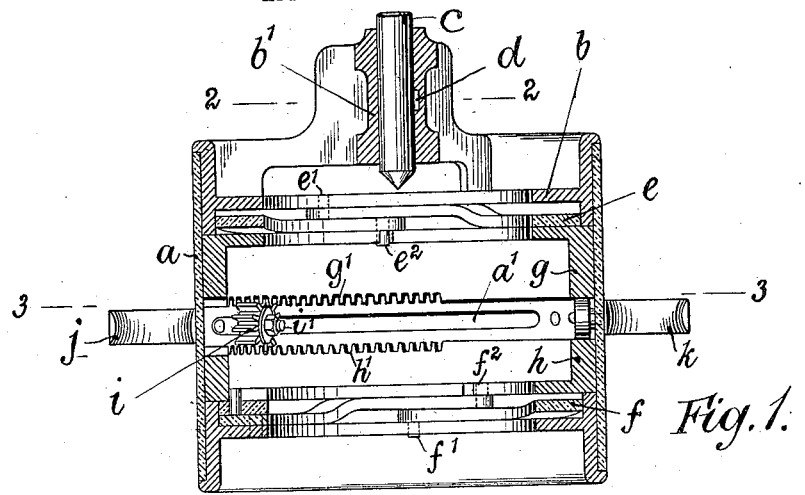
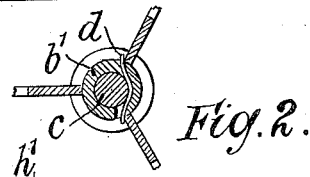
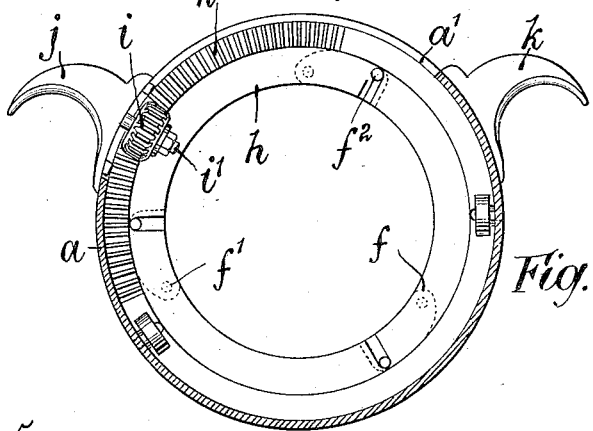
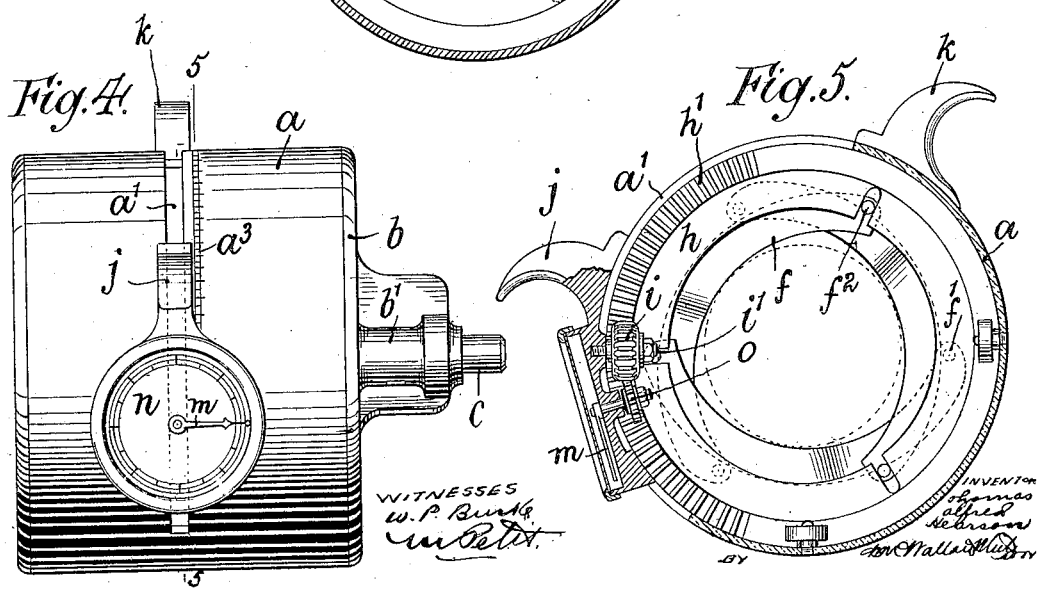

UNITED STATES PATENT OFFICE.

THOMAS ALFRED HEARSON, OF LONDON, ENGLAND.

CENTERING AND GAGING INSTRUMENT FOR BARS.

No. 887,092.  Specification of Letters Patent.  Patented May 12, 1908.

Application filed June 7, 1907. Serial No. 377,771.

*To all whom it may concern:*

Be it known that I, THOMAS ALFRED HEARSON, subject of the King of Great Britain, residing at 22 Southampton Buildings, Chancery Lane, London, England, have invented new and useful Improvements in Centering and Gaging Instruments for Bars, of which the following is a specification.

This invention relates to a device for centering or alternatively for gaging bars.

The chief purpose which the device is intended to serve is the finding and marking on the end of a bar, the position of the end of its axis, in preparation for the operation of turning or boring the bar in a lathe, but the same device is adapted to serve the purpose of measuring the diameter of the bar and, by showing by an index and scale the diameter at each of two portions which are at a fixed distance apart, or alternatively the mean diameter and their difference, to provide the means for determining the rate of taper, if any, of the bar.

The device comprises two so called "iris" diaphragms of the type commonly in use in photographic cameras, which diaphragms are mounted within a tube or other form of carrier at a fixed distance apart. Each iris diaphragm is composed of a set of plates pivotally mounted, and so connected that they can be simultaneously turned through equal angles, so that they all approach or recede from a central axis of the carrier by exactly equal amounts, the extent of rotation requisite to close the diaphragm plates into contact with the bar being if desired arranged to be read by an index and scale. Each of the two iris diaphragms are connected together so as to be moved simultaneously or successively. A small number of elements or leaves of the contracting and expanding iris diaphragm will suffice. For example, if only three leaves were used, it would be certain that each would make its contact with the surface of the bar and would suffice for a bar of circular section, but four or more may be employed.

In the end of the tubular carrier a co-axial tubular orifice is provided to fit a center-punch which thereby, in a guided manner, can be driven by the blow of a hammer into contact with the end of the inserted bar and, mark the end of the axis. By the aid of a spring, the punch may be retained ready for use. After the centers have been marked by the aid of the centering device above described, the bars can be drilled at the center marks by means of a drilling machine in the usual way.

On the accompanying drawings is shown a form of construction of this invention.

Figure 1 is a central sectional elevation. Fig. 2 is a cross section taken along the line 2—2 of Fig. 1. Fig. 3 is a cross section taken along the line 3—3 of Fig. 1. Fig. 4 is an outside view, showing a graduated dial and pointer for reading the difference in the two diameters of a bar when embraced by the iris plates. Fig. 5 is a cross section taken along the line 5—5 of Fig. 4.

In these figures, $a$ is a short hollow cylinder which is adapted to form the carrier, within which the iris diaphragms are mounted. This carrier is provided at each end with a ring $b$ in the center of one of which a tubular orifice $b^1$ is formed for the guided reception of a center punch $c$, a plate spring $d$ being provided for frictionally retaining the punch normally out of operation. Within the carrier tube $a$ two sets $e\,f$ of segmental iris plates are pivotally mounted by means of pins $e^1\,f^1$, secured to the plates, being inserted into holes drilled equi-distantly in the rings $b$. Only three such segmental plates for each set are shown, though a larger number may be fitted if desired. These plates are constrained to undergo equal angular displacement around their pivots by means of the insertion of pins $e^2\,f^2$, secured to each plate, each within one of a number of equi-distant slotways formed in a pair of rings $g\,h$, each of which is so mounted, within the carrier $a$, as to be adapted to be rotated about its axis through a limited angle. On the edges of the rings $g$ and $h$ which face one another, crown teeth $g^1$ and $h^1$ are provided on a portion of the circumference and gearing with both sets of teeth is a pinion $i$ which is mounted to turn freely on a stud $i^1$ which is secured to a finger-piece $j$, this latter being fitted to slide along a circumferential slotway $a^1$ formed in the carrier-tube $a$.

On drawing the movable finger-piece $j$ towards a fixed finger-piece $k$ which is secured to the carrier-tube, a movement which can be readily performed by a finger and the thumb of one hand, both sets of iris plates $e$ and $f$ will be shifted into the closing position, *i. e.* towards the center and, when one set has effected a close embrace of an inserted bar, the further movement of the finger-piece $j$ will cause the pinion $i$ to revolve by virtue of its engagement with what will then, for the time, be a fixed circular rack, either $g^1$ or $h^1$, and the other ring, either $h$ or $g$, will move onwards at twice the rate of the finger-piece and cause presently the second set of iris plates to effect a close embrace of the inserted rod. The instrument can thus be accurately centered by one hand relatively to a bar, whether the latter is tapered or parallel, and the other hand will be available to strike a blow on the center punch $c$, this latter being frictionally retained in the operative position by the plate-spring $d$.

When both sets of iris plates are in close embrace, the position of the movable finger-piece $j$ will determine the mean diameter of the inserted bar as measured at the two embraced sections and if the carrier-tube $a$ is suitably graduated as shown at $a^3$ Fig. 4, such mean diameter can be read on such scale of graduation.

In order to determine the degree of taper of the bar, if any, means may be provided for showing the angular situation of the pinion $i$, as by a pointer $m$ on a graduated dial $n$ carried by the movable finger-piece, the pointer being secured to a spindle to which also is secured a pinion $o$ which gears with the before mentioned pinion $i$. If a parallel bar is inserted in the centering instrument, the pointer will stand at zero because the closure of both sets of iris plates will be effected without any rotation of the pinion $i$ but, if the two portions of the bar which are embraced by the two sets of iris plates are of different diameters then there will be a relative movement of the two toothed rings $g$ and $h$ which will result in a rotation of the pinion $i$ and be transmitted by the pinion $o$ to the pointer $m$, whereby the difference in the two diameters can be read off on the dial plate.

Claims.

1. In an instrument for centering bars, a hollow carrier, two sets of iris plates pivoted in the carrier, a pair of angularly displaceable rings mounted in the carrier and adapted each to displace one of the sets of iris plates, means common to both rings adapted to displace them differentially, and a center punch axially mounted in said carrier.

2. In an instrument for gaging bars, a hollow carrier, two sets of iris plates pivoted in the carrier, a pair of angularly displaceable rings mounted in the carrier and adapted each to displace one of the sets of iris plates, means common to both rings adapted to displace them differentially, means carried by the carrier and adapted to indicate the mean diameter of the inserted bar, and means carried by the carrier and adapted to indicate the degree of taper of said bar.

3. In an instrument for centering bars, a hollow cylindrical carrier formed with a circumferential slotway, a pair of fixed rings secured in said carrier, two sets of iris plates, each set pivoted on one of said fixed rings respectively, a pair of angularly displaceable rings mounted in said carrier, slotways formed in said displaceable rings, pins on said iris plates engaging in said slotways, racks formed on the adjacent edges of said displaceable rings, a pinion in gear with both of said racks, a finger piece on which said pinion is mounted adapted to be displaced along said circumferential slotway formed in said carrier, a fixed finger piece secured to said carrier and a center punch axially mounted in said carrier.

4. In an instrument for gaging bars, a hollow cylindrical carrier formed with a circumferential slotway, a pair of fixed rings secured in said carrier, two sets of iris plates, each set pivoted on one of said fixed rings respectively, a pair of angularly displaceable rings mounted in said carrier, slotways formed in said displaceable rings, pins on said iris plates engaging in said slotways, racks formed on the adjacent edges of said displaceable rings, a pinion in gear with both of said racks, a finger piece on which said pinion is mounted adapted to be displaced along said circumferential slotway formed in said carrier, a fixed finger piece secured to said carrier, a scale provided on said carrier along which said movable finger piece is adapted to be displaced, a dial provided on said movable finger piece, a pointer adapted to be moved over said dial, and a second pinion connected with said pointer and gearing with the first pinion.

5. In an instrument for gaging and centering bars, a hollow cylindrical carrier formed with a circumferential slotway, a pair of fixed rings secured in said carrier, two sets of iris plates, each set pivoted on one of said fixed rings respectively, a pair of angularly displaceable rings mounted in said carrier, slotways formed in said displaceable rings, pins on said iris plates engaging in said slotways, racks formed on the adjacent edges of said displaceable rings, a pinion in gear with both of said racks, a finger piece on which said pinion is mounted adapted to be displaced along said circumferential slotway formed in said carrier, a fixed finger piece secured to said carrier, a scale provided on said carrier along which said movable finger piece is adapted to be displaced, a dial provided on said movable finger piece, a pointer adapted to be moved over said dial, a second pinion connected with said pointer and gearing with the first pinion, and a center punch axially mounted in said carrier.

In testimony whereof I have signed my name to this specification in the presence of two subscribing witnesses.

THOMAS ALFRED HEARSON.

Witnesses:
H. D. JAMESON,
R. F. WILLIAMS.